United States Patent
Wu (10) Patent No.: US 9,668,185 B2
(45) Date of Patent: May 30, 2017

(54) DEVICE AND METHOD OF HANDLING SYSTEM INFORMATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/169,760

(22) Filed: Jun. 1, 2016

(65) Prior Publication Data

US 2016/0353346 A1 Dec. 1, 2016

Related U.S. Application Data (60) Provisional application No. 62/168,934, filed on Jun. 1, 2015, provisional application No. 62/171,259, filed on Jun. 5, 2015.

(51) Int. Cl.
| | |
|---|---|
| *H04W 36/00* | (2009.01) |
| *H04W 36/16* | (2009.01) |
| *H04W 48/16* | (2009.01) |
| *H04W 76/04* | (2009.01) |
| *H04W 48/10* | (2009.01) |
| *H04W 48/12* | (2009.01) |
| *H04W 48/20* | (2009.01) |

(52) U.S. Cl.
CPC ..... *H04W 36/165* (2013.01); *H04W 36/0066* (2013.01); *H04W 36/0083* (2013.01); *H04W 48/16* (2013.01); *H04W 76/046* (2013.01); *H04W 48/10* (2013.01); *H04W 48/12* (2013.01); *H04W 48/20* (2013.01)

(58) Field of Classification Search
CPC ..... H04W 36/08; H04W 36/12; H04W 36/14; H04W 36/18; H04W 36/30; H04W 36/0055
USPC ........................................ 455/436, 438, 440
See application file for complete search history.

(56) References Cited

U.S. PATENT DOCUMENTS

| | | | |
|---|---|---|---|
| 2013/0053103 A1 | 2/2013 | Kim | |
| 2015/0094068 A1* | 4/2015 | Kubota | H04W 48/12 455/436 |
| 2015/0195755 A1* | 7/2015 | Gulati | H04W 36/0061 455/436 |
| 2016/0165496 A1* | 6/2016 | Amirijoo | H04W 36/0083 455/437 |

OTHER PUBLICATIONS

3GPP TS 36.300 V12.5.0 (Mar. 2015).
3GPP TS 36.331 V12.5.0 (Mar. 2015).
(Continued)

*Primary Examiner* — Temica M Beamer
(74) *Attorney, Agent, or Firm* — Winston Hsu; Scott Margo (57) ABSTRACT

A communication device for handing system information comprises a storage unit for storing instructions and a processing means coupled to the storage unit. The processing means is configured to execute the instructions stored in the storage unit. The instructions comprise receiving a system information comprising at least one of a freqBandIndicator and a first multiBandInfoList from a first cell in a radio resource control (RRC) connected mode; and not disregarding the at least one of the freqBandIndicator and the first multiBandInfoList in the system information.

11 Claims, 5 Drawing Sheets

(56) References Cited

OTHER PUBLICATIONS

3GPP TS 36.101 V12.7.0 (Mar. 2015).
Search Report mailed/issued on Nov. 15, 2016 for EP application No. 16172184.0, pp. 1-22.
3GPP TS 36.331 V12.5.0 (Mar. 2015), "3rd Generation Partnership Project; Technical Specification Group Radio Access Network; Evolved Universal Terrestrial Radio Access (E-UTRA); Radio Resource Control (RRC); Protocol specification (Release 12)", XP050928130, pp. 1-445.
Ericsson, "Discussion on AdditionalSpectrumEmission at handover", 3GPP TSG-RAN WG2 #90, Tdoc R2-152198, May 25-29, 2015, Fukuoka, Japan, XP050973562, pp. 1-3.
HTC, "Discussion on additionalSpectrumEmission", 3GPP TSG-RAN2 Meeting #91, R2-153679, Aug. 24-28, 2015, Beijing, China, XP051004340, pp. 1-4.

\* cited by examiner

DEVICE AND METHOD OF HANDLING SYSTEM INFORMATION

CROSS REFERENCE TO RELATED APPLICATIONS

This application claims both the benefit of U.S. Provisional Application No. 62/168,934, filed on Jun. 1, 2015, and U.S. Provisional Application No. 62/171,259, filed on Jun. 5, 2015, which are incorporated herein by reference.

BACKGROUND OF THE INVENTION

1. Field of the Invention

The present invention relates to a communication device and a method used in a wireless communication system, and more particularly, to a communication device and a method of handling system information in a wireless communication system.

2. Description of the Prior Art

In a long-term evolution (LTE) system, the UE may receive a system information in a radio resource control (RRC) connected mode from a cell of a network. However, it is not clearly specified how to apply an information element in the system information.

Thus, how to handle the system information received from the network is a problem to be solved.

SUMMARY OF THE INVENTION

The present invention therefore provides a communication device and a method for handling system information to solve the abovementioned problem.

A communication device for handing system information comprises a storage unit for storing instructions and a processing means coupled to the storage unit. The processing means is configured to execute the instructions stored in the storage unit. The instructions comprise receiving a system information comprising at least one of a freqBandIndicator and a first multiBandInfoList from a first cell in a radio resource control (RRC) connected mode; and not disregarding the at least one of the freqBandIndicator and the first multiBandInfoList in the system information.

A communication device for handing system information comprises a storage unit for storing instructions and a processing means coupled to the storage unit. The processing means is configured to execute the instructions stored in the storage unit. The instructions comprise receiving a system information from a first cell; and disregarding a first AdditionalSpectrumEmission, a first ul-CarrierFreq and a first multiBandInfoList in the system information in a radio resource control (RRC) connected mode in the first cell.

A communication device for handing system information comprises a storage unit for storing instructions and a processing means coupled to the storage unit. The processing means is configured to execute the instructions stored in the storage unit. The instructions comprise receiving a first system information from a first cell in a RRC idle mode; initiating a RRC connection establishment procedure to the first cell for entering a RRC connected mode after receiving the first system information; not disregarding at least one of a first freqBandIndicator and a first multiBandInfoList in the first system information in the RRC connected mode; applying a first AdditionalSpectrumEmission in the first system information, if the communication device supports a frequency band indicated in the first freqBandIndicator in the first system information in the RRC connected mode; and applying a second AdditionalSpectrumEmission in the first system information, if the communication device supports the frequency band indicated in the first multiBandInfoList in the first system information in the RRC connected mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
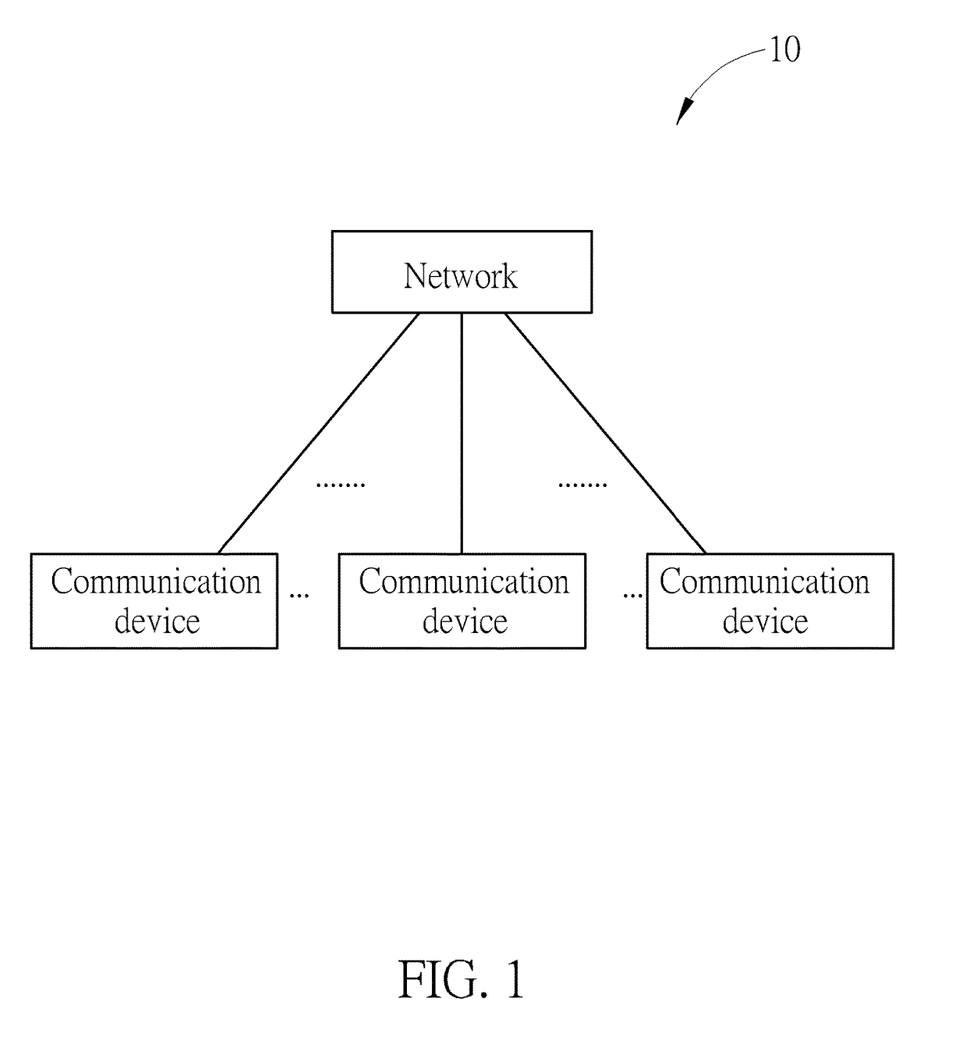
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) comprising at least one Node-B (NB) and/or a Radio Network Controller (RNC) in a universal mobile telecommunications system (UMTS). In one example, the network may be an evolved UTRAN (E-UTRAN) comprising at least one evolved NB (eNB) and/or at least one relay in a long term evolution (LTE) system, a LTE-Advanced (LTE-A) system or an evolution of the LTE-A system. In another example, the network may be a fifth generation (5G) network including at least one 5G base station (BS) which employs orthogonal frequency-division multiplexing (OFDM) and/or non-OFDM, and a transmission time interval (TTI) for communicating with the communication devices is smaller than 1 millisecond (ms). In general, a base station (BS) may also be used to refer any of the NB, the RNC, the eNB and the 5G BS.

A communication device can be a user equipment (UE), a low cost device (e.g., machine type communication (MTC) device), a mobile phone, a laptop, a tablet computer, an electronic book, a portable computer system, a vehicle or aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
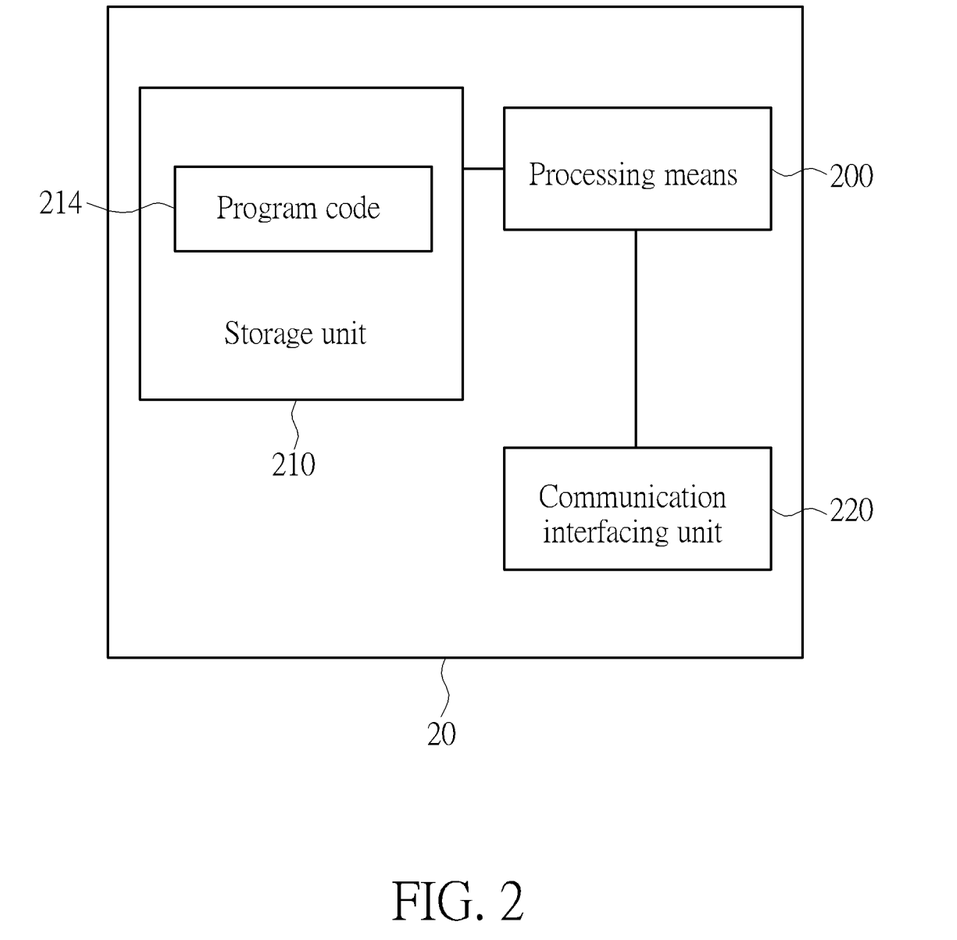
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200. For simplicity, the UE is used to represent the communication device in FIG. 1 in the following examples.

Figure 3:
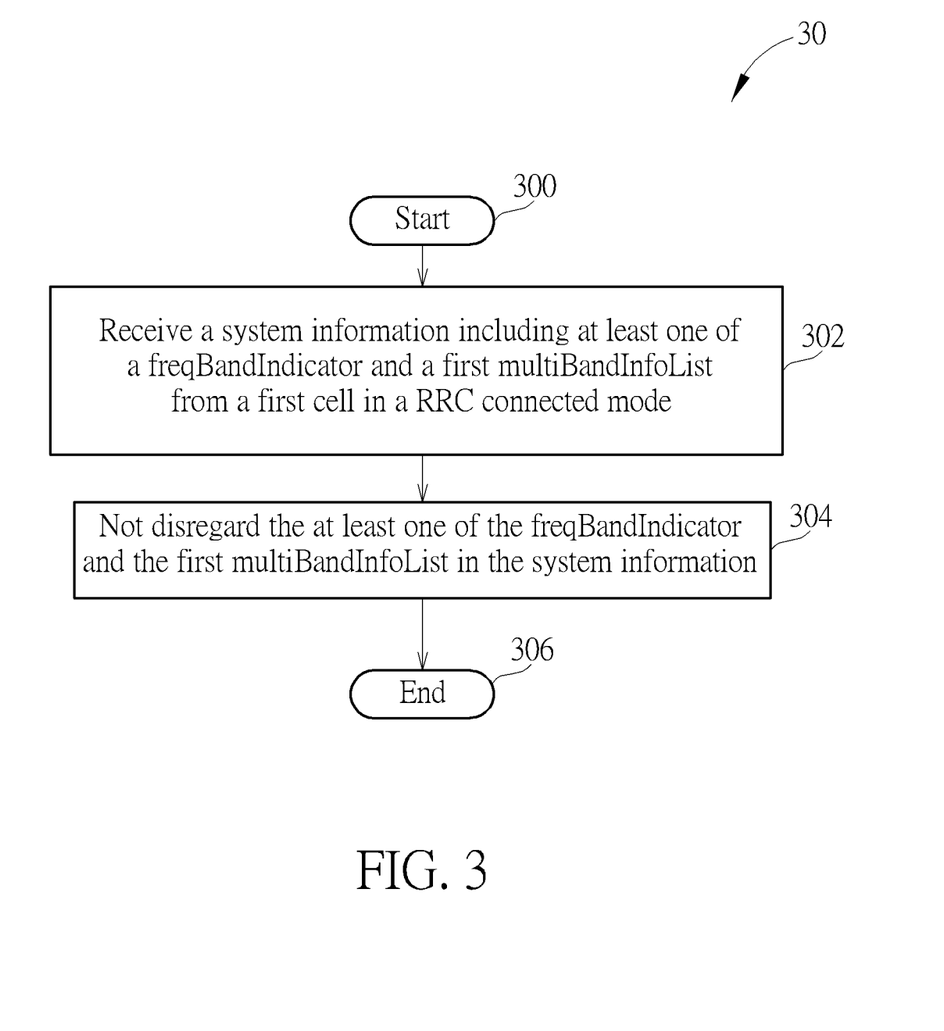
FIG. 3 is a flowchart of a process according to an example of the present invention.

FIG. 3 is a flowchart of process 30 according to an example of the present invention. The process 30 may be utilized in a UE of FIG. 1, to handle system information. The process 30 may be compiled into the program code 214 and includes the following steps:

Step 300: Start.

Step 302: Receive a system information including at least one of a freqBandIndicator and a first multiBandInfoList from a first cell in a radio resource control (RRC) connected mode.

Step 304: Not disregard the at least one of the freqBandIndicator and the first multiBandInfoList in the system information.

Step 306: End.

According to the process 30, the UE receives a system information including at least one of a freqBandIndicator and a first multiBandInfoList from a first cell in a RRC connected mode (e.g., RRC_CONNECTED). Then, the UE in the first cell does not disregard the at least one of the freqBandIndicator and the first multiBandInfoList in the system information. That is, the UE does not disregard (e.g., regards or considers) the freqBandIndicator and the first multiBandInfoList after receiving the system information in the RRC connected mode. The first multiBandInfoList indicates at least one frequency band which the first cell is operated on. In one example, the system information includes at least one of a system information block (SIB) type 1 (SIB1) and SIB type 2 (SIB2) which is broadcasted on the first cell by a base station.

Realization of the present invention is not limited to the above description. The following examples may be applied to the process 30.

In one example, the UE may not disregard the at least one of the freqBandIndicator and the first multiBandInfoList when the UE is in a RRC idle mode in the first cell.

In one example, the UE in the first cell further applies a first AdditionalSpectrumEmission in the system information (e.g., the SIB1 or the SIB2) according to the freqBandIndicator in the system information (e.g., the SIB1), when applying the freqBandIndicator in the RRC connected mode. Alternatively, the UE in the first cell applies a second AdditionalSpectrumEmission in the system information (e.g., the SIB2), when applying a frequency band in the first multiBandInfoList in the system information in the RRC connected mode. That is, the UE applies (or uses) different AdditionalSpectrumEmission, when applying the frequency bands indicated in different information elements (e.g., the freqBandIndicator or the first multiBandInfoList). The first AdditionalSpectrumEmission and/or the second AdditionalSpectrumEmission may be included in a second multiBandInfoList in the system information.

In one example, the UE applies the freqBandIndicator or the frequency band in the first multiBandInfoList according to at least one frequency band which the UE is capable of operating on. In one example, the frequency band in the first multiBandInfoList is a first listed frequency band which the UE is capable of operating on. In one example, the UE determines that it is capable of receiving and transmitting a data, when the UE supports a frequency band indicated in the at least one of the freqBandIndicator and the first multiBandInfoList in the system information, after the UE does not disregard the at least one of the freqBandIndicator and the first multiBandInfoList in the system information.

In one example, the UE receives a handover command from a second cell. The UE performs a handover operation from the second cell to the first cell according to the handover command, before receiving the system information (e.g., the SIB1) of the first cell. Then, the UE determines a frequency band of the first cell according to the handover command. After performing the handover operation and receiving the system information of the first cell, the UE may apply the first AdditionalSpectrumEmission corresponding to the frequency band, if the frequency band is indicated in the freqBandIndicator in the system information, and may apply a third AdditionalSpectrumEmission in the system information corresponding to the frequency band, if the frequency band is indicated in the first multiBandInfoList in the system information. The third AdditionalSpectrumEmission may be in a second multiBandInfoList in the system information and may be the same as or different from the second AdditionalSpectrumEmission. That is, the UE determines the frequency band according to the handover command, and determines which AdditionalSpectrumEmission should be applied according to where (e.g., the freqBandIndicator or the first multiBandInfoList) the frequency band is indicated.

Thus, the UE applies the first AdditionalSpectrumEmission or the second AdditionalSpectrumEmission in the system information in the RRC connected mode according to where the frequency band is indicated.

Figure 4:
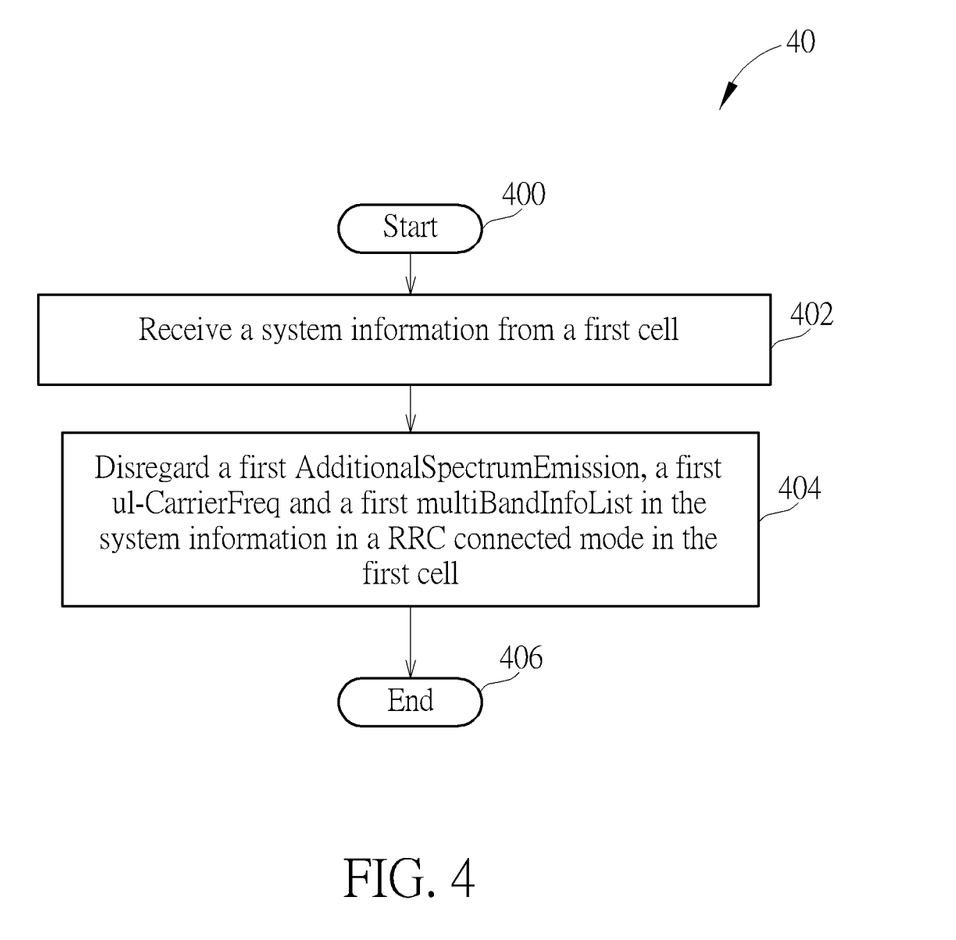
FIG. 4 is a flowchart of a process according to an example of the present invention.

FIG. 4 is a flowchart of process 40 according to an example of the present invention. The process 40 may be utilized in a UE of FIG. 1, to handle system information. The process 40 may be compiled into the program code 214 and includes the following steps:

Step 400: Start.

Step 402: Receive a system information from a first cell.

Step 404: Disregard a first AdditionalSpectrumEmission, a first ul-CarrierFreq and a first multiBandInfoList in the system information in a RRC connected mode in the first cell.

Step 406: End.

According to the process 40, the UE receives a system information from a first cell in a RRC idle mode or a RRC connected mode (e.g., RRC_CONNECTED). Then, the UE disregards a first AdditionalSpectrumEmission, a first ul-CarrierFreq and a first multiBandInfoList in the system information in the RRC connected mode in the first cell. That is, the UE does not apply (or use) the first AdditionalSpectrumEmission, the first ul-CarrierFreq, and any AdditionalSpectrumEmission in the first multiBandInfoList when the UE is in the RRC connected mode in the first cell. In one example, the system information includes at least one of a SIB1 and a SIB2 which is broadcasted on the first cell by a base station. The first AdditionalSpectrumEmission, the first ul-CarrierFreq, and the first multiBandInfoList may be in the SIB1 or the SIB2.

Realization of the present invention is not limited to the above description. The following examples may be applied to the process 40.

In one example, the UE disregards a first freqBandIndicator and a second multiBandInfoList in the system information (e.g., the SIB1) in the first cell when the UE is in the RRC connected mode in the first cell. The UE receives the system information in the RRC idle mode or the RRC connected mode from the first cell. That is, the UE does not only disregard the first AdditionalSpectrumEmission, the first ul-CarrierFreq, and the first multiBandInfoList in the system information (e.g., the SIB1 or the SIB2), but also disregards the first freqBandIndicator and the second multiBandInfoList in the system information. The second multiBandInfoList indicates at least one frequency band on which the first cell is operated.

In one example, the UE receives a handover command from a second cell. The UE performs a handover operation from the second cell to the first cell according to the handover command, before receiving the system information. Then, the UE determines a frequency band of the first cell according to the handover command. After the handover operation, the UE receives the system information. The UE applies the first AdditionalSpectrumEmission in the system information, if the frequency band is indicated in the first freqBandIndicator. Alternatively, the UE applies a second AdditionalSpectrumEmission in the first multiBandInfoList in the system information corresponding to the frequency band, if the frequency band is indicated in the second multiBandInfoList in the system information. That is, the UE determines the frequency band according to the handover command, and determines which AdditionalSpectrumEmission should be applied according to where (e.g., the first freqBandIndicator or the second multiBandInfoList) the frequency band is indicated.

Thus, the problem in the prior art is solved by disregarding the first multiBandInfoList in the system information in the RRC connected mode. That is, the UE does not apply (or use) any AdditionalSpectrumEmission in the first multiBandInfoList in the system information for performing a transmission to the cell. Thus, the UE does not incorrectly apply an AdditionalSpectrumEmission for performing the transmission.

Figure 5:
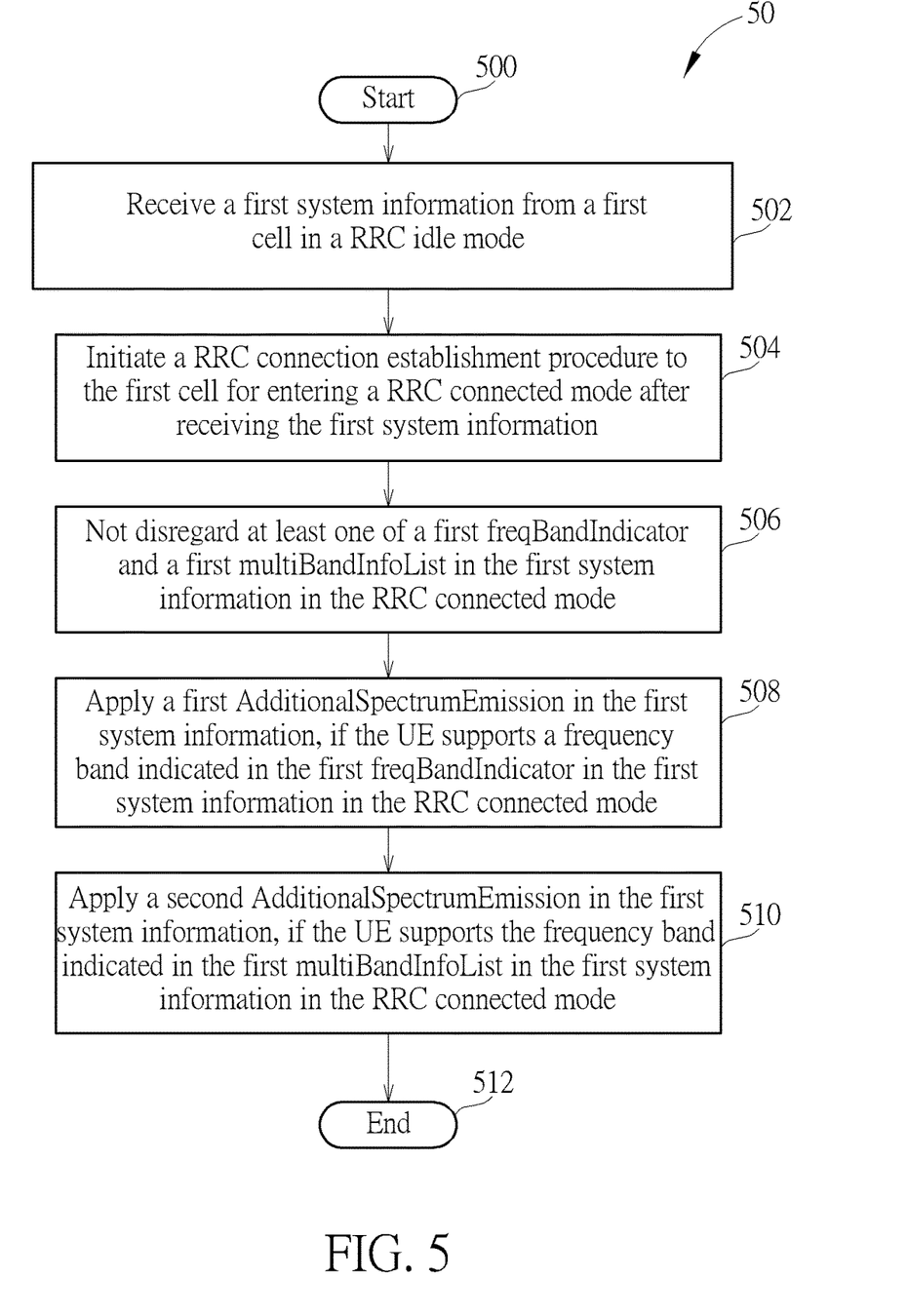
FIG. 5 is a flowchart of a process according to an example of the present invention.

FIG. 5 is a flowchart of process 50 according to an example of the present invention. The process 50 may be utilized in a UE of FIG. 1, to handle system information. The process 50 may be compiled into the program code 214 and includes the following steps:

Step 500: Start.

Step 502: Receive a first system information from a first cell in a RRC idle mode.

Step 504: Initiate a RRC connection establishment procedure to the first cell for entering a RRC connected mode after receiving the first system information.

Step 506: Not disregard at least one of a first freqBandIndicator and a first multiBandInfoList in the first system information in the RRC connected mode.

Step 508: Apply a first AdditionalSpectrumEmission in the first system information, if the UE supports a frequency band indicated in the first freqBandIndicator in the first system information in the RRC connected mode.

Step 510: Apply a second AdditionalSpectrumEmission in the first system information, if the UE supports the frequency band indicated in the first multiBandInfoList in the first system information in the RRC connected mode.

Step 512: End.

According to the process 50, the UE receives a first system information from a first cell in a RRC idle mode. The UE initiates a RRC connection establishment procedure to the first cell for entering a RRC connected mode (e.g., RRC_CONNECTED) after receiving the first system information. The UE does not disregard at least one of a first freqBandIndicator and a first multiBandInfoList in the first system information in the RRC connected mode in the first cell. Then, the UE may apply a first AdditionalSpectrumEmission in the first system information, if the UE supports a frequency band indicated in the first freqBandIndicator in the first system information in the RRC connected mode. The UE may apply a second AdditionalSpectrumEmission in the first system information, if the UE supports the frequency band indicated in the first multiBandInfoList in the first system information in the RRC connected mode. That is, the UE applies the first AdditionalSpectrumEmission or the second AdditionalSpectrumEmission, when the UE transfers from the RRC idle mode to the RRC connected mode and does not disregard the at least one of the first freqBandIndicator and the first multiBandInfoList in the RRC connected mode. The first system information on the first cell may include at least one of a first SIB1 and a first SIB2 which is broadcasted on the first cell by a base station. Thus, the problem in the prior art is solved.

Realization of the present invention is not limited to the above description. The following examples may be applied to the process 50.

In one example, the first AdditionalSpectrumEmission and/or the second AdditionalSpectrumEmission may be included in a second multiBandInfoList in the first system information.

In one example, the frequency band indicated in the first multiBandInfoList in the first system information (e.g., the first SIB1) is a first frequency band listed in the first multiBandInfoList in order. In one example, the UE applies an additionalSpectrumEmissionSCell-r10 for the first cell and at least one secondary cell (SCell), when receiving a first message, wherein the first message configures the at least one SCell which has the same as a frequency band of the first cell, and includes the additionalSpectrumEmissionSCell-r10 indicating a network signaling (NS) value for the first cell and the at least one SCell for the UE to apply. The UE receives a second message for releasing all of the at least one SCell from the first cell. After releasing the all of the at least one SCell, the UE may apply the first AdditionalSpectrumEmission in the first system information (e.g., the first SIB1 or the first SIB2) instead of the additionalSpectrumEmissionSCell-r10, if the UE supports the frequency band indicated in the first freqBandIndicator, and may apply the second AdditionalSpectrumEmission in the first system information (e.g., the first SIB1 or the first SIB2) instead of the additionalSpectrumEmissionSCell-r10, if the UE supports the frequency band indicated in the first multiBandInfoList in the first system information (e.g., the first SIB1) in the RRC connected mode (e.g., RRC_CONNECTED). Further, the first message may be a first RRCConnectionReconfiguration message and the second message may be a second RRCConnectionReconfiguration message. Both RRCConnectionReconfiguration messages may or may not include a mobilityControlInfo from the first cell.

In one example, the UE applies the additionalSpectrumEmissionSCell-r10 for the first cell and the at least one SCell, when the at least one SCell is activated. In one example, the UE applies the first AdditionalSpectrumEmission in the first system information if the UE supports the frequency band indicated in the first freqBandIndicator and applies the second AdditionalSpectrumEmission in the first system information if the UE supports the frequency band indicated in the first multiBandInfoList in the first system information, if the at least one SCell is not released and none of the at least one SCell is activated. That is, the UE determines to apply which AdditionalSpectrumEmission according to whether the at least one SCell is activated.

In one example, the UE receives a handover command including a third AdditionalSpectrumEmission, a carrierFreq or a carrierFreq-v9e0 from a second cell. The UE performs a handover operation from the first cell to the second cell according to the handover command. Then, the UE applies the third AdditionalSpectrumEmission in the handover command for performing a transmission with the second cell. The UE receives a second system information including a second SIB1 and a second SIB2 from the second cell, after performing the handover operation. Accordingly, the UE may apply a fourth AdditionalSpectrumEmission in the second system information (e.g., the second SIB1 or the second SIB2), if the UE supports the frequency band indicated in a second freqBandIndicator in the second system information (e.g., the second SIB1 or the second SIB2) of the second cell in the RRC connected mode, and may apply a fifth AdditionalSpectrumEmission in the second system information of the second cell, if the UE supports the frequency band indicated in a third multiBandInfoList in the second system information in the RRC connected mode; wherein the frequency band is derived by the UE according to the carrierFreq or the carrierFreq-v9e0. That is, the UE applies (or uses) the third AdditionalSpectrumEmission in the handover command before receiving the second system information of the second cell. After receiving the second system information of the second cell, the UE determines which AdditionalSpectrumEmission should be applied according to where (e.g., the second freqBandIndicator or the third multiBandInfoList) the frequency band is indicated. The fourth AdditionalSpectrumEmission and/or the fifth AdditionalSpectrumEmission may be included in a fourth multiBandInfoList in the second system information of the second cell.

In one example of the processes 30-50, the UE may support a communication with a plurality of multi-band cells. In one example of the processes 30-50, "disregard" means "not use" or "not apply".

Those skilled in the art should readily make combinations, modifications and/or alterations on the abovementioned description and examples. The abovementioned description, steps and/or processes including suggested steps can be realized by means that could be hardware, software, firmware, an electronic system, or combination thereof. An example of the means may be the communication device 20.

To sum up, the present invention provides a device and a method for handling system information. By not disregarding at least one of a freqBandIndicator and a first multiBandInfoList in a system information in the RRC connected mode, the UE knows which AdditionalSpectrumEmission should be applied according to where a frequency band is indicated. In addition, The UE does not incorrectly apply an AdditionalSpectrumEmission in a second multiBandInfoList in the system information by disregarding the second multiBandInfoList in the system information in the RRC connected mode.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A communication device for handing system information, comprising:
   a storage unit, for storing instructions of:
   receiving a handover command from a first cell;
   performing a handover operation from the first cell to a second cell according to the handover command, before receiving a system information;
   receiving the system information comprising at least one of a freqBandIndicator and a first multiBandInfoList from the second cell in a radio resource control (RRC) connected mode;
   not disregarding the at least one of the freqBandIndicator and the first multiBandInfoList in the system information;
   determining a frequency band of the second cell according to the handover command;
   applying a first Additional SpectrumEmission corresponding to the frequency band, if the frequency band is indicated in the freqBandIndicator; and
   applying a second Additional Spectrum emission in the system information corresponding to the frequency band, if the frequency band is indicated in the first multiBandInfoList in the system information; and
   a processing means, coupled to the storage unit, configured to execute the instructions stored in the storage unit.

2. The communication device of claim 1, wherein the storage unit further stores instructions of:
   applying the first AdditionalSpectrumEmission in the system information according to the freqBandIndicator, when applying the freqBandIndicator in the RRC connected mode; or
   applying the second AdditionalSpectrumEmission in the system information, when applying the frequency band in the first multiBandInfoList in the system information in the RRC connected mode.

3. The communication device of claim 1, wherein the instruction of not disregarding the at least one of the freqBandIndicator and the first multiBandInfoList in the system information comprises:
   determining that the communication device is capable of receiving and transmitting a data, when the communication device supports the frequency band indicated in the at least one of the freqBandIndicator and the first multiBandInfoList in the system information.

4. A communication device for handing system information, the communication device comprises:
   a storage unit, for storing instructions of:
   receiving a handover command from a first cell;
   performing a handover operation from the first cell to a second cell according to the handover command, before receiving a system information;
   receiving the system information from the second cell;
   disregarding a first AdditionalSpectrumEmission, a first ul-CarrierFreq and a first multiBandInfoList in the system information in a radio resource control (RRC) connected mode in the second cell;
   disregarding a first freqBandIndicator and a second multiBandInfoList in the system information in the second cell;
   determining a frequency band of the second cell according to the handover command;

applying the first AdditionalSpectrumEmission after the handover operation, if the frequency band is indicated in the first freqBandIndicator; and applying a second Additional SpectrumEmission in the first multiBandInfoList in the system information corresponding to the frequency band, if the frequency band is indicated in the second multiBandInfoList in the system information; and a processing means, coupled to the storage unit, configured to execute the instructions stored in the storage unit.

5. A communication device for handing system information, the communication device comprises:

a storage unit, for storing instructions of:

receiving a first system information from a first cell in a radio resource control (RRC) idle mode;

initiating a RRC connection establishment procedure to the first cell for entering a RRC connected mode after receiving the first system information;

not disregarding at least one of a first freqBandIndicator and a first multiBandInfoList in the first system information in the RRC connected mode;

applying a first Additional SpectrumEmission in the first system information, if the communication device supports a frequency band indicated in the first freqBandIndicator in the first system information in the RRC connected mode; and applying a second Additional SpectrumEmission in the first system information, if the communication device supports the frequency band indicated in the first multiBandInfoList in the first system information in the RRC connected mode; and a processing means, coupled to the storage unit, configured to execute the instructions stored in the storage unit.

6. The communication device of claim 5, wherein the frequency band indicated in the first multiBandInfoList in the first system information is a first frequency band listed in the first multiBandInfoList in order.

7. The communication device of claim 5, wherein the storage unit further stores instructions of:

applying an additional SpectrumEmissionSCell-r10 for the first cell and at least one secondary cell (SCell), when receiving a first message, wherein the first message configures the at least one SCell which has the same as a frequency band of the first cell, and comprises the additionalSpectrumEmissionSCell-r10 indicating a network signaling (NS) value for the first cell and the at least one SCell;

receiving a second message for releasing all of the at least one SCell from the first cell;

applying the first Additional SpectrumEmission in the first system information, if the communication device supports the frequency band indicated in the first freqBandIndicator; and applying the second AdditionalSpectrumEmission in the first system information, if the communication device supports the frequency band indicated in the first multiBandInfoList in the first system information in the RRC connected mode.

8. The communication device of claim 7, wherein the communication device applies the additional SpectrumEmissionSCell-r10 for the first cell and the at least one SCell, when the at least one SCell is activated.

9. The communication device of claim 7, wherein if the at least one SCell is not released and none of the at least one SCell is activated, applying the first Additional SpectrumEmission in the first system information if the communication device supports the frequency band indicated in the first freqBandIndicator; and applying the second AdditionalSpectrumEmission in the first system information if the communication device supports the frequency band indicated in the first multiBandInfoList in the first system information.

10. The communication device of claim 5, wherein the storage unit further stores instructions of:

receiving a handover command comprising a third Additional SpectrumEmission, a carrierFreq or a carrierFreq-v9e0 from a second cell;

performing a handover operation from the first cell to the second cell according to the handover command;

applying the third Additional SpectrumEmission in the handover command for performing a transmission with the second cell;

receiving a second system information from the second cell, after performing the handover operation;

applying a fourth AdditionalSpectrumEmission in the second system information, if the communication device supports the frequency band indicated in a second freqBandIndicator in the second system information in the RRC connected mode; and applying a fifth Additional SpectrumEmission in the second system information, if the communication device supports the frequency band indicated in a second multiBandInfoList in the second system information in the RRC connected mode;

wherein the frequency band is derived according to the carrierFreq or the carrierFreq-v9e0.

11. The communication device of claim 5, wherein the communication device supports a communication with a plurality of multi-band cells.

* * * * *